United States Patent
Takeda et al.

(10) Patent No.: US 12,120,565 B2
(45) Date of Patent: Oct. 15, 2024

(54) BASE STATION APPARATUS, TERMINAL APPARATUS, CONTROL METHOD, AND COMPUTER-READABLE STORAGE MEDIUM FOR EFFICIENT TRACKING

(71) Applicant: KDDI CORPORATION, Tokyo (JP)

(72) Inventors: Hiroki Takeda, Tokyo (JP); Yanwei Li, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 0 days.

(21) Appl. No.: 18/169,997

(22) Filed: Feb. 16, 2023

(65) Prior Publication Data

US 2023/0199589 A1    Jun. 22, 2023

Related U.S. Application Data

(63) Continuation of application No. PCT/JP2021/048317, filed on Dec. 24, 2021.

(30) Foreign Application Priority Data

Jan. 6, 2021  (JP) ................. 2021-001032

(51) Int. Cl.
*H04W 36/00* (2009.01)
*H04W 36/32* (2009.01)
*H04W 48/20* (2009.01)

(52) U.S. Cl.
CPC . *H04W 36/00835* (2018.08); *H04W 36/0061* (2013.01); *H04W 36/32* (2013.01); *H04W 48/20* (2013.01)

(58) Field of Classification Search
CPC ....... H04W 36/00835; H04W 36/0061; H04W 36/32; H04W 48/20
See application file for complete search history.

(56) References Cited

U.S. PATENT DOCUMENTS 8,649,291 B2   2/2014 Wang et al.
8,948,758 B2   2/2015 Dahlén
(Continued)

FOREIGN PATENT DOCUMENTS

CN   103281775 A   9/2013
CN   111052821 A   4/2020
(Continued)

OTHER PUBLICATIONS

"3rd Generation Partnership Project; Technical Specification Group Radio Access Network; NG-RAN; Xn application protocol (XnAP) (Release 16)", 3GPP TS 38.423 V16.4.0 (Jan. 2021), Jan. 4, 2021, Internet: <URL:https://www.3gpp.org/ftp/Specs/archive/38_series/38.423/38423-g40.zip> sections 8.4.1.2, 8.4.2.2, 27 pages.
(Continued)

*Primary Examiner* — Charles N Appiah
*Assistant Examiner* — Frank E Donado
(74) *Attorney, Agent, or Firm* — Foley & Lardner LLP

(57) ABSTRACT

A base station apparatus acquires, for a cell formed by the base station apparatus, a list of area identifiers belonging to a tracking area the same as that of the cell and information of an area identifier of a neighbor cell adjacent to the cell, determines whether or not the area identifier of the neighbor cell is included in the list, and notifies a terminal apparatus of information in which information of the neighbor cell and a result of the determining are associated together.

15 Claims, 4 Drawing Sheets

(56) References Cited

U.S. PATENT DOCUMENTS

| | | | |
|---|---|---|---|
| 9,173,155 B2* | 10/2015 | Kamalaraj | H04W 40/248 |
| 9,432,892 B2 | 8/2016 | Dahl[E,Acu E[Ee N | |
| 9,462,516 B2 | 10/2016 | Dahlén | |
| 10,531,348 B2 | 1/2020 | Kim et al. | |
| 11,064,412 B2 | 7/2021 | Kim et al. | |
| 11,246,077 B2 | 2/2022 | Tang | |
| 11,533,663 B2 | 12/2022 | Tsuda | |
| 11,825,442 B2 | 11/2023 | Chen et al. | |
| 2007/0149217 A1 | 6/2007 | Balachandran et al. | |
| 2011/0305184 A1* | 12/2011 | Hsu | H04W 36/00835 370/312 |
| 2012/0196617 A1* | 8/2012 | Sun | H04W 36/0061 455/456.1 |
| 2013/0337797 A1* | 12/2013 | Ban | H04W 84/00 455/422.1 |
| 2014/0024377 A1 | 1/2014 | Bergqvist et al. | |
| 2014/0092871 A1* | 4/2014 | Wang | H04W 36/34 370/331 |
| 2014/0153474 A1* | 6/2014 | Zhao | H04W 36/00835 370/312 |
| 2015/0024753 A1* | 1/2015 | Palenius | H04W 36/0058 455/436 |
| 2017/0311221 A1* | 10/2017 | Pudney | H04W 68/02 |
| 2018/0098261 A1 | 4/2018 | Wang et al. | |
| 2018/0199163 A1* | 7/2018 | Chen | H04W 48/14 |
| 2018/0376505 A1* | 12/2018 | Zhang | H04L 12/189 |
| 2020/0178204 A1 | 6/2020 | Chen et al. | |
| 2020/0358547 A1 | 11/2020 | Liu et al. | |
| 2021/0014915 A1* | 1/2021 | Geng | H04W 84/02 |
| 2021/0235415 A1 | 7/2021 | Sha et al. | |
| 2022/0078688 A1 | 3/2022 | Tang | |
| 2022/0377659 A1* | 11/2022 | Venkataraman | H04W 48/20 |
| 2023/0051569 A1* | 2/2023 | Jiang | H04W 36/08 |
| 2024/0031982 A1 | 1/2024 | Chen et al. | |

FOREIGN PATENT DOCUMENTS

| | | |
|---|---|---|
| CN | 111641982 A | 9/2020 |
| JP | 5139540 B2 | 5/2011 |
| JP | 2013-038586 A | 2/2013 |
| JP | 2020-530242 A | 10/2020 |
| JP | 2021-513256 A | 5/2021 |
| JP | 2021-513793 A | 5/2021 |
| JP | 2021-520131 A | 8/2021 |
| WO | WO-2017/039211 A | 3/2017 |
| WO | WO-2019/157661 A1 | 8/2019 |
| WO | WO-2019/157890 A1 | 8/2019 |
| WO | WO-2019/192584 A1 | 10/2019 |
| WO | WO-2019/193858 A1 | 10/2019 |

OTHER PUBLICATIONS

KDDI Corporation, "Considerations on contents of slice related cell selection info", 3GPP TSG-RAN WG2 Meeting #112 electronic R2-2102231 (Revision of R2-2100646), Internet: <URL:https://www.3gpp.org/ftp/TSG_RAN/WG2_RL2/TSGR2_113-e/Docs/R2-2102231.zip>, Jan. 22, 2021, pp. 1-3, chapter 2 (option 3, option 4), 4 pages.

IN Office Action for Corresponding IN Appl. Ser. No. 202347010432 dated Nov. 29, 2023 (6 pages).

EP Supplementary Search Report for Appl. Ser. No. EP 21917720 dated Jan. 23, 2024 (13 pages).

Ericsson "Slice configuration at NG and Xn Setup," 3GPP Draft, R3-174716_Slicing_NG_Setup, 3rd Generation Partnership Project (3GPP), Mobile Competence Centre, 650, Route Des Lucioles, F-06921 Sophia-Antipolis Cedex, France, vol. RAN WG3, No. Reno, Nevada, USA, Nov. 27, 2017-Dec. 1, 2017, Nov. 18, 2017 (5 pages).

OPPO: "Further Discussion on Configuration of Dedicated Frequency Priority for Network Slicing Regardless of RFSP or Allowed NSSAI and TP to TS 38.300", R2-1806709 3GPP TSG-RAN2 Meeting #102 Busan, Korea, May 21-25, 2018 (3 pages).

CN Office Action for Chinese Patent Application No. 202180050505.7 dated Apr. 24, 2024 (23 pages).

* cited by examiner

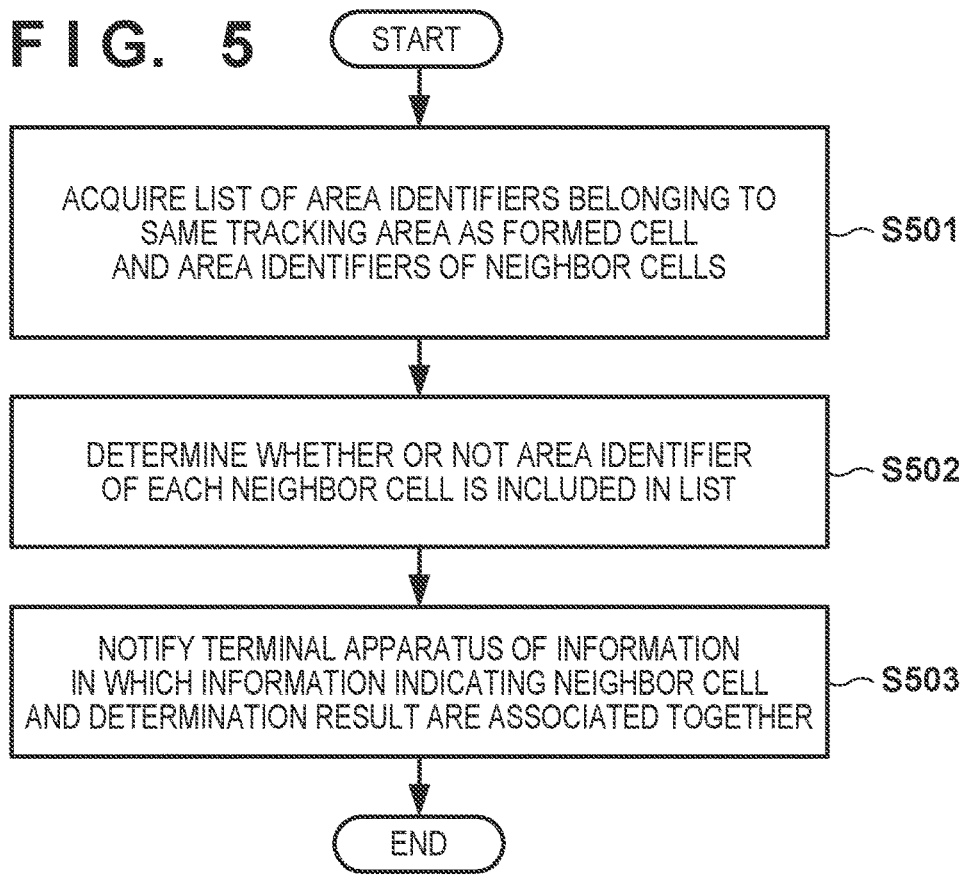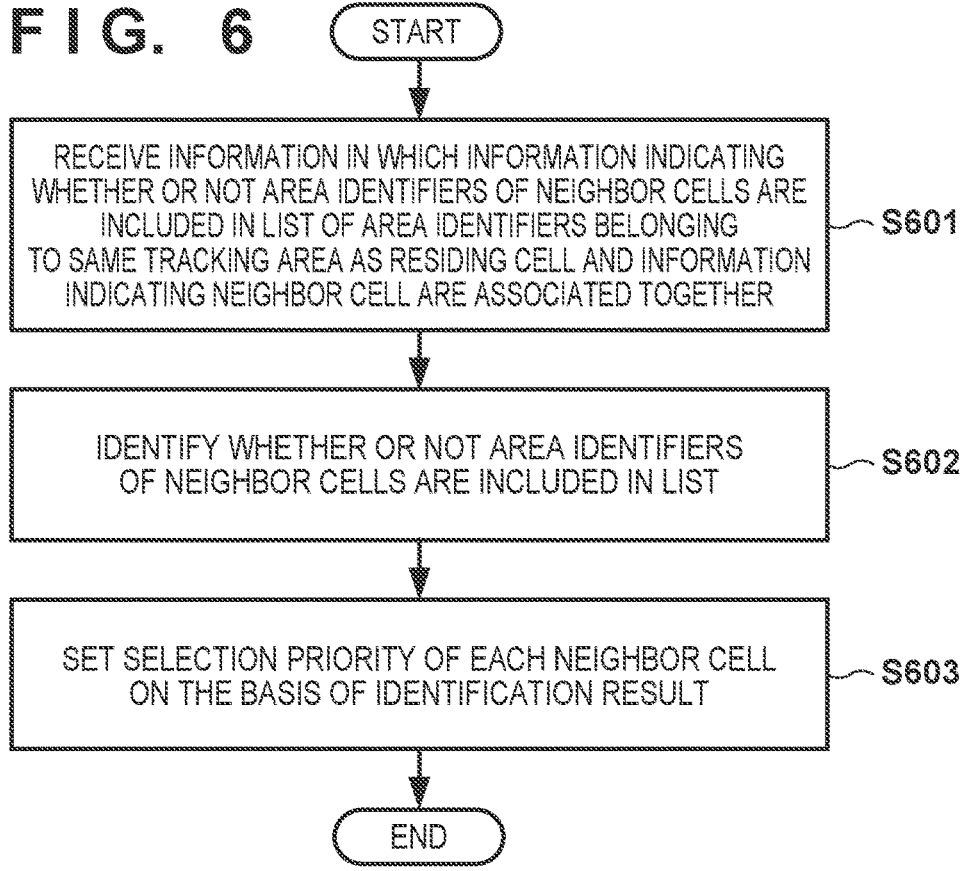

BASE STATION APPARATUS, TERMINAL APPARATUS, CONTROL METHOD, AND COMPUTER-READABLE STORAGE MEDIUM FOR EFFICIENT TRACKING

CROSS-REFERENCE TO RELATED APPLICATION(S)

This application is a continuation of International Patent Application No. PCT/JP2021/048317 filed on Dec. 24, 2021, which claims priority to and the benefit of Japanese Patent Application No. 2021-001032 filed on Jan. 6, 2021, the entire disclosures of which are incorporated herein by reference.

BACKGROUND OF THE INVENTION

Field of the Invention

The present invention relates to a technique for increasing tracking efficiency in a cellular communication system.

Description of the Related Art

In a 5th generation (5G) cellular communication system, logical networks optimized per service are configured as network slices. A network slice may be configured for only a specific frequency. In this case, even at the same location, different network slices can be provided at different frequencies. Note that when different network slices are provided at different frequencies in the same location, the network slices are allocated a different Tracking Area Code (TAC) per frequency.

A terminal apparatus stores a list of Tracking Area Identities (TAIs) corresponding to Tracking Area Codes (TACs) and executes tracking processing when the terminal apparatus moves into the cell with a TAI not included in the list. However, when TACs are allocated per frequency as described above, even when the terminal apparatus does not geographically move, tracking processing may be executed when the terminal apparatus moves to the frequency of a TAI not included in the stored TAI list. This may increase the load of the network.

SUMMARY OF THE INVENTION

The present invention realizes a technique for increasing the efficiency of tracking processing.

A base station apparatus according to an aspect of the present invention includes an acquiring unit configured to acquire, for a cell formed by the base station apparatus, a list of area identifiers belonging to a tracking area the same as that of the cell and information of an area identifier of a neighbor cell adjacent to the cell; a determining unit configured to determine whether or not the area identifier of the neighbor cell is included in the list; and a notifying unit configured to notify a terminal apparatus of a result of the determining including information enabling the terminal apparatus to determine whether or not the terminal apparatus diverges from the tracking area by changing cells, associated with information of the neighbor cell.

A terminal apparatus according to another aspect of the present invention includes a receiving unit configured to receive, from a base station apparatus forming a residing cell where the terminal apparatus is in standby, predetermined information in which information indicating whether or not an area identifier of a neighbor cell adjacent to the residing cell is included in a list of area identifiers belonging to a tracking area the same as that of the residing cell and information indicating the neighbor cell are associated together; and a setting unit configured to set a priority for selecting the neighbor cell on a basis of the predetermined information.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 5 is a diagram illustrating a first example of the flow of processing executed by the base station apparatus.

FIG. 6 is a diagram illustrating a first example of the flow of processing executed by the terminal apparatus.

DESCRIPTION OF THE EMBODIMENTS

Figure 1:
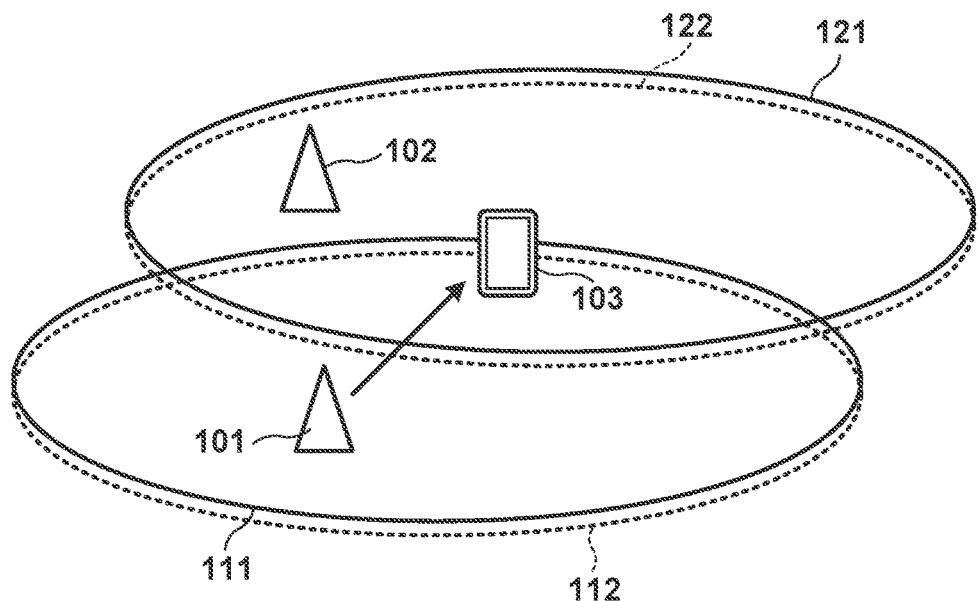
FIG. 1 is a diagram illustrating an example of the configuration of a wireless communication system.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

System Configuration

FIG. 1 illustrates an example of the configuration of a wireless communication system according to the present embodiment. The wireless communication system, for example, is a cellular wireless communication system of the fifth generation (5G) or a previous or following generation. The wireless communication system includes a base station apparatus 101 and a terminal apparatus 103. The base station apparatus 101, for example, forms a cell 111 and a cell 112 using different frequency ranges and can communicate with the terminal apparatus 103 within either cellular range. Note that the geographical area shared by the cell 111 and the cell 112 may be the coverage area. When in a standby state, the terminal apparatus 103 selects either the cell 111 or the cell 112 (or the corresponding frequency) and resides in that cell. Also, the terminal apparatus 103, when connecting, can communicate with the base station apparatus 101 via at least the cell 111 or the cell 112. The wireless communication system may include another base station apparatus 102 that forms a cell 121 and a cell 122 adjacent to the cells formed by the base station apparatus 101. Note that in the example of FIG. 1, only two base station apparatuses and one terminal apparatus are illustrated, but naturally more base station apparatuses and terminal apparatuses may exist.

The terminal apparatus 103 needs to execute tracking processing when the terminal apparatus 103 moves to a cell with a TAI not included in the currently stored Tracking Area Identity (TAI) list. Note that TAI is identification information able to be identified on the basis of a Tracking Area Code (TAC), and TAI and TAC may be used interchangeably hereinafter. Note that hereinafter, TAI may also be used interchangeably with the more common term, area identifier. In other words, TAI is merely one mode of an area identifier, and the following description can be applied to a discretionary system that executes tracking in a similar manner to a cellular communication system. When the terminal apparatus 103 executes tracking processing, a core network identifies the location of the terminal apparatus 103 in terms of tracking areas and can call the terminal apparatus 103 by transmitting a paging message to the entire area of the tracking area where the terminal apparatus 103 is. Note that the terminal apparatus 103 does not need to execute tracking processing when moving between cells with TAIs included in the currently stored TAI list.

In the present embodiment, as described above, different network slices can be provided to the terminal apparatus 103 at different frequencies. In this case, different TACs (TAIs) are allocated to different frequencies (different cells) even for the same location. For example, the cell 111 and the cell 112 are allocated different TACs (TAIs), and the cell 121 and the cell 122 are allocated different TACs (TAIs). In this example, the terminal apparatus 103 resides in the cell 111, for example, and stores a TAI list including the TAIs of the cell 111 and the cell 121 and not including the TAIs of the cell 112 and the cell 122. Even if the terminal apparatus 103 does not move, the frequency may move on the basis of wireless quality, changing the residing cell from the cell 111 to the cell 112. In this case, the terminal apparatus 103 determines that the terminal apparatus 103 has moved to the cell 112 corresponding to a TAI not included in the stored TAI list and executes tracking processing. Also, when the frequency moves again and the terminal apparatus 103 resides in the cell 111, tracking processing may be executed again. Thus, by executing tracking processing multiple times, may radio resources are unnecessarily wasted, and the power consumption of the terminal apparatus 103 may be increased. In the present embodiment, in light of this, a system is provided in which the number of times the terminal apparatus 103 executes tracking processing is reduced and tracking processing is efficiently executed.

For example, the base station apparatus 101 and the base station apparatus 102 acquire, for the cell they formed, a list (TAI list, for example) of area identifiers belonging to the same tracking area as the cell and information (TACs or TAIs, for example) of the area identifiers of the neighbor cells adjacent to the cell. The base station apparatus 101, for example, acquires a first list of area identifiers belonging to the same tracking area as the cell 111 formed by the base station apparatus 101, a second list of area identifiers belonging to the same tracking area as the cell 112 formed in a similar manner by the base station apparatus 101, and area identifiers of the cell 121 and the cell 122 formed by the base station apparatus 102. Also, the base station apparatus 102, for example, acquires a third list of area identifiers belonging to the same tracking area as the cell 121 formed by the base station apparatus 101, a fourth list of area identifiers belonging to the same tracking area as the cell 122 formed in a similar manner by the base station apparatus 101, and area identifiers of the cell 111 and the cell 112 formed by the base station apparatus 101. Then, the base station apparatus 101 and the base station apparatus 102 determine whether or not the area identifiers of the neighbor cells adjacent to the cell they formed are included in the list corresponding to the cell. For example, the base station apparatus 101 determines whether or not the area identifier for the cell 121, the cell 122, and the cell 112 are in the first list corresponding to the cell 111.

Then, when notifying the terminal apparatus of the information indicating the neighbor cell, the base station apparatus 101 and the base station apparatus 102 additionally transmit information indicating the result of the determination of whether or not each neighbor cell is included in the list corresponding to the cell they formed. For example, the base station apparatus 101, for the cell 111, notifies the terminal apparatus 103 of information indicating that the neighbor cells are the cell 112, the cell 121, and the cell 122 and notifies the terminal apparatus 103 at this time of information indicating whether or not the area identifiers of these cells are included in the list of area identifiers belonging to the same tracking area as the cell 111. Note that a notification from the base station apparatus 101 includes information indicating that the neighbor cells for the cell 112 are the cell 111, the cell 121, and the cell 122 and information indicating whether or not the area identifiers of these cells are included in the list of area identifiers belonging to the same tracking area as the cell 112. For example, information indicating whether or not the area identifiers of the neighbor cells (for example, the cell 112, the cell 121, and the cell 122) are included in the list of area identifiers belonging to the same tracking area as the cell (for example, the cell 111) information is transmitted about is represented by 1-bit information. For example, 0 represents when the area identifier of the neighbor cell is included in the list of area identifiers belonging to the same tracking area as the cell information is transmitted about and 1 represents when this is not included, and this is included in the notification information.

The information indicating the neighbor cells may include a cell identifier, for example. In this case, for example, the cell identifier and the bit indicating whether the cell area identifier is included in the list of area identifiers belonging to the same tracking area as the cell information is transmitted about are associated together in the notification. Accordingly, the residing terminal apparatus can identify the neighbor cells for which tracking processing is required (in other words, the neighbor cells diverging from the tracking area the residing cell is included in). As a result, when the terminal apparatus selects a cell again, for example, by not transitioning to a cell that requires tracking processing, frequent execution of the tracking processing can be prevented.

Also, the information indicating the neighbor cells may include information of the frequencies used in the neighbor cells. In other words, the base station apparatus 101 and the base station apparatus 102 may notify the terminal apparatus of information in which information indicating the frequencies used in the one or more cells formed by the other base station apparatus and area identifiers of the cells corresponding to the frequencies are associated together. Accordingly, the residing terminal apparatus can identify the frequencies of destinations for which tracking processing is required (in other words, the destinations diverging from the tracking area the residing cell is included in). As a result, when the terminal apparatus selects a cell again, for example, by not transitioning to a cell with a frequency that requires tracking processing, frequent execution of the tracking processing can be prevented.

Note that the base station apparatus 101 and the base station apparatus 102, for example, may, on the basis of the relationship between the frequencies used in all of the neighbor cells of the cell they formed and whether or not the area identifiers of the neighbor cells are included in the list of area identifiers corresponding to the tracking area including the cell they formed, issue a notification, without identifying each neighbor cell, including information in which the frequency and whether or not moving to that frequency requires tracking are associated together. For example, for a first frequency, when all of the neighbor cells include an area identifier belonging to the tracking area of the cell information is transmitted about, information indicating that moving to the first frequency does not require tracking is associated. Also, for example, for a second frequency, when all of the neighbor cells include an area identifier not belonging to the tracking area of the cell information is transmitted about, information indicating that moving to the second frequency does require tracking is associated. Also, for example, for a third frequency, when a predetermined proportion or more of the neighbor cells include an area identifier belonging to the tracking area of the cell information is transmitted about, information indicating that moving to the third frequency does not require tracking or that there is a high possibility that tracking is not required is associated. Also, for example, for a fourth frequency, when less than a predetermined proportion of the neighbor cells include an area identifier belonging to the tracking area of the cell information is transmitted about, information indicating that moving to the fourth frequency does require tracking or that there is a high possibility that tracking is required is associated. In this case, the base station apparatus 101 and the base station apparatus 102 notify the residing terminal apparatus of information in which information indicating the frequencies and information indicating whether or not moving to those frequencies require tracking processing (indicating whether or not there is divergence from the tracking area that the cell for which information is transmitted belongs to) or information indicating whether or not there is a high possibility that tracking processing is required are associated together. In this case, information relating to the necessity of tracking processing may be represented using multiple bits.

Note that the base station apparatus 101 and the base station apparatus 102 may acquire the list of area identifiers belonging to the same tracking area as the cell they formed from the core network, for example. In this manner, the base station apparatus can notify the terminal apparatus of appropriate information by acquiring the latest information from the core network. For example, the base station apparatus 101 and the base station apparatus 102 may transmit an NG SETUP REQUEST message for establishing a connection interface with the core network and may acquire the list information via an NG SETUP RESPONSE message, which is a response to the NG SETUP REQUEST message. Also, the base station apparatus 101 and the base station apparatus 102 may acquire the list information via an AMF CONFIGURATION UPDATE message used to update settings relating to a service slice or the like. Also, the base station apparatus 101 and the base station apparatus 102 may acquire the list information via a different message. Note that the list information may be manually set when installing the base station apparatus 101 and the base station apparatus 102, and the list information does not have to be acquired from the core network.

The base station apparatus 101 and the base station apparatus 102 may acquire information of the area identifier of a neighbor cell from another base station apparatus that forms the neighbor cell. By acquiring information of the area identifier from an adjacent base station apparatus, the base station apparatus can issue a notification including information appropriate for a change, such as when the area identifier is changed by the update of a network slice provided by the adjacent base station apparatus. For example, the base station apparatus 101 may acquire information of the area identifier for the cell 121 and the cell 122 from the base station apparatus 102. The base station apparatus 101 and the base station apparatus 102, for example, establish an Xn interface for communicating with the adjacent base station apparatus and, at this time, via exchanging an XN SETUP REQUEST message and an XN SETUP RESPONSE message, may acquire information of the area identifier of the cell formed by the adjacent base station apparatus from the adjacent base station apparatus. Also, the base station apparatus 101 and the base station apparatus 102 may acquire information of the area identifier of a cell formed by another base station apparatus by exchanging an NG-RAN NODE CONFIGURATION UPDATE message and an NG-RAN NODE CONFIGURATION UPDATE ACKNOWLEDGE message for updating setting data of an application level required for cooperative operation via the Xn interface between the two base station apparatuses. Note that these are examples, and the information of the area identifier of a cell formed by an adjacent base station apparatus may be acquired via a different message. Also, the base station apparatus 101 and the base station apparatus 102 may acquire the information of the area identifier of a neighbor cell from the core network.

Note that the information may be transmitted using System Information Block (SIB), for example. In other words, the base station apparatus 101 and the base station apparatus 102 may transmit the information described above via a broadcast signal such that the terminal apparatus residing in the cell formed by the base station apparatus can acquire the information. Note that the base station apparatus 101 and the base station apparatus 102, for example, may transmit the information described above via a message (for example, a Radio Resource Control (RRC) message, such as an RRCReconfiguration, an RRCResume, an RRCRelease, and the like) transmitted to the terminal apparatus transitioning to a connected state or the terminal apparatus transitioning from a connected state to a non-connected state.

When the terminal apparatus 103 receives the information described above from the base station apparatus 101 that forms the cell the terminal apparatus 103 is residing in, for example, the cell including the area identifier belonging to the same tracking area as the currently residing cell is set as a cell with a high selection priority. Selection priority is an indicator, with higher values being more easily selected by the terminal apparatus 103. For example, when the terminal apparatus 103 resides in the cell 111 and the area identifier of the cell 121 is included in the list, from the base station apparatus 101, of area identifiers belonging to the same tracking area as the cell 111 but the area identifiers of the cell 112 and the cell 122 are not included, the terminal apparatus 103 increases the priority of the cell 121 and/or decreases the priority of the cell 112 and the cell 122. Note that when the cell identifiers of each cell and information indicating whether or not moving to each cell requires tracking processing (in other words, whether or not they diverge from the tracking area including the area identifier of the residing cell) are acquired, for example, the terminal apparatus 103 may set the priority of each cell. Also, when the frequencies and information indicating whether or not moving to each frequency requires tracking processing (in other words, whether or not they diverge from the tracking area including the area identifier of the residing cell) are acquired, for example, the terminal apparatus 103 may set the priority of each frequency. For example, when tracking processing is not required as long as the first frequency is used, the terminal apparatus 103 sets the first frequency to a high priority. Also, for example, when tracking processing is reliably required when the second frequency is used, the terminal apparatus 103 sets the second frequency to a low priority. Also, for example, when tracking processing is required at a predetermined probability when the third frequency is used, the terminal apparatus 103 sets the third frequency to a moderate priority.

The terminal apparatus 103, for example, may prioritize the neighbor cell with a high priority and receive the notification information (for example, Master Information Block (MIB) or SIB1). By not receiving the information described above, receiving the notification information transmitted by the neighbor cell, and checking the notification information (for example, SIB1), the terminal apparatus can determine that tracking processing is required and, as a result, select another cell. However in this case, since the notification information of the neighbor cell needs to be checked each time, the time taken until cell selection is completed may be a long time. However, according to a method of the present embodiment, on the basis of the information transmitted by the residing cell, the terminal apparatus can check which neighbor cells would require tracking processing if moved to without receiving notification information of the neighbor cell. Thus, with processing executed in a short amount of time, the frequency of tracking processing can be reduced. Note that the terminal apparatus 103 may assign priority as in the present embodiment in addition to a preexisting assigned priority. For example, for a cell requiring tracking processing, the terminal apparatus 103 may decrease the priority set via a known method a predetermined level or set the priority level to the minimum value. On the other hand, for a cell that does not require tracking processing, the priority set via a known method may be used as is by the terminal apparatus 103. In this manner, the terminal apparatus 103 can use the priority set via a known method and preferentially select a cell that does not require tracking processing.

Also, for a cell with a high priority, for example, the terminal apparatus 103 may start a search on the basis of the wireless quality of the residing cell being a first level or less and, for a cell with intermediate priority, may start a search on the basis of the wireless quality being equal to or less than a second level lower than the first level. Also, for a cell with low priority, the terminal apparatus 103 may execute processing for searching or the like when the wireless quality of the residing cell is equal to or less than the second level and a cell with intermediate priority cannot be found. In other words, the terminal apparatus 103 may, on the basis of a set priority, set the condition relating to starting a search for a cell corresponding to that priority. Also, the terminal apparatus 103 may set the condition when moving to the found cell, for example. In other words, the terminal apparatus 103 may execute settings to move when, for a cell with high priority, the wireless quality is greater than a third level and, for a cell with low priority, to not move as long as the wireless quality is not greater than a fourth level higher than the third level.

Note that the terminal apparatus 103 may receive the information described above from the core network during operation in a connected state, for example. In other words, the information described above may be generated by the core network and not by a base station apparatus.

Note that in the embodiment described above, for the neighbor cell, whether tracking processing is required when moving from the cell information is transmitted about is determined and a notification is issued from the base station apparatus (or the core network). However, no such limitation is intended. For example, the base station apparatus (or the core network) may notify the terminal apparatus of the TACs (or TAIs) of the neighbor cells when notifying the terminal apparatus of a list of the neighbor cells. In other words, the base station apparatus may acquire information of the area identifiers of the neighbor cell adjacent to the cell formed by the base station apparatus and notify the terminal apparatus of the area identifiers of the neighbor cells and information indicating the neighbor cells associated together. Also, when the terminal apparatus receives this information, the terminal apparatus may determine whether the area identifiers of the neighbor cells are included in the list (for example, a TAI list) of area identifiers belonging to the same tracking area as the residing cell stored by the terminal apparatus. Then, the terminal apparatus may set the selection priority for each neighbor cell on the basis of the determination result. In other words, the determination executed by the base station apparatus in the example described above may be executed by the terminal apparatus. Note that areas other than what the determination is executed by may be similar to that in the example described above.

In this manner, for each neighbor cell, the terminal apparatus is notified of information indicating whether tracking processing is required when moving to the neighbor cell, and the terminal apparatus preferentially selects a cell that does not require tracking processing. This can prevent frequent execution of the tracking processing and allow tracking processing to be executed efficiently. Also, accordingly, the terminal apparatus can continuously select a cell with an area identifier corresponding to the network slice desired for execution, for example. Note that, for example, when the number of terminal apparatuses belonging to one or more tracking areas is greater than the number of terminal apparatuses belonging to another tracking area, information in a notification by the base station apparatus may be set such that a cell requiring tracking processing is preferentially selected to promote movement of the terminal apparatus to the other tracking area.

Note that in the example described above, processing executed by the terminal apparatus while in standby is described. However, the terminal apparatus may select the handover destination cell using similar criteria during connection. For example, the terminal apparatus may set a handover threshold such that a handover to a cell requiring tracking processing is less likely to occur than a handover to a cell not requiring tracking processing. In other words, when a handover to a first neighbor cell not requiring tracking processing is performed in response to the wireless quality of the first neighbor cell being greater than the wireless quality of the connected cell by the first level, a handover to a second neighbor cell requiring tracking processing may not be performed as long as the wireless quality of the second neighbor cell is not greater than the wireless quality of the connected cell by the second level greater than the first level. Note that, for example, when a cell that supports the network slice the terminal apparatus is communicating with is present, even if the cell requires tracking processing, the terminal apparatus may perform handover to this cell. On the other hand, when there is no handover destination candidate cell that supports the network slice the terminal apparatus is communicating with, for the terminal apparatus, the base station apparatus may perform handover with a change to another network slice. Also, when there is no handover destination candidate cell that supports the network slice the terminal apparatus is communicating with, the base station apparatus may notify the terminal apparatus that communication has ended without performing handover. As described above, the terminal apparatus can be notified of the handover threshold by the base station apparatus, and the terminal apparatus side can execute threshold determination. Also, without the terminal apparatus being notified of the handover threshold, and the wireless quality of the candidate cell reported by the terminal apparatus can be compared with a handover threshold stored on the base station apparatus side to determine a candidate cell.

Apparatus Configuration

Figure 2:
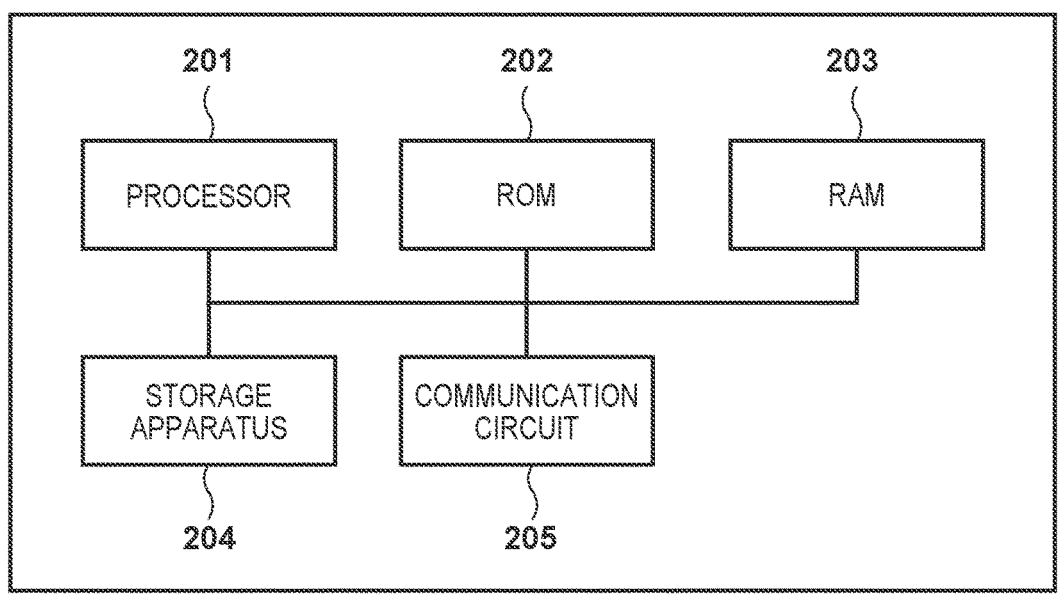
FIG. 2 is a diagram illustrating an example of the hardware configuration of a base station apparatus and a terminal apparatus.

Next, an example of the hardware configuration of the communication apparatuses (for example, the base station apparatus 101, the base station apparatus 102, and the terminal apparatus 103) that execute the processing described above will be described using FIG. 2. The communication apparatus includes, for example, a processor 201, ROM 202, RAM 203, a storage apparatus 204, and a communication circuit 205. The processor 201 is a computer, such as a general-purpose central processing unit (CPU), an application specific integrated circuit (ASIC), or the like, including one or more processing circuits. By the processor 201 reading out and executing a program stored in the ROM 202 and the storage apparatus 204, the processing of the entire communication apparatus and the processing described above are executed. The ROM 202 is read-only memory that stores information, such as a program relating to processing executed by the communication apparatus, various parameters, and the like. The RAM 203 is random-access memory that functions as a work space when the processor 201 executes a program and temporary stores information. The storage apparatus 204 is constituted by a detachable external storage device, for example. The communication circuit 205 is constituted by a circuit for 5G wireless communication, for example. Note that in FIG. 2, only a single communication circuit 205 is illustrated, but the communication apparatus may include a plurality of communication circuits. For example, the communication apparatus may include another communication circuit 205 for each of the plurality of usable frequency bands. Also, the communication apparatus may include a common communication circuit 205 shared by one or more of the plurality of frequency bands. Furthermore, for example, the terminal apparatus 103 may include not only the communication circuit 205 for cellular communication but also the communication circuit 205 compatible with another wireless communication standard such as wireless LAN.

Figure 3:
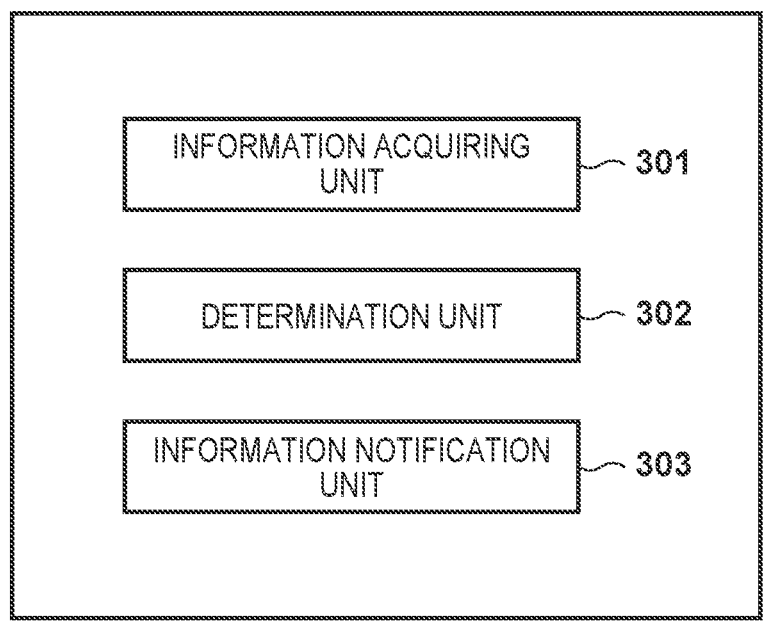
FIG. 3 is a diagram illustrating an example of the functional configuration of the base station apparatus.

FIG. 3 is a diagram illustrating an example of the functional configuration of the base station apparatus (the base station apparatus 101 and the base station apparatus 102). The base station apparatus, for example, includes an information acquiring unit 301, a determination unit 302, and an information notification unit 303. Note that in FIG. 3, only the functions relating specifically to the present embodiment are illustrated, and various other functions that the base station apparatus may include are omitted from the diagram. For example, the base station apparatus naturally includes other functions typically included in a base station apparatus in a cellular communication system. Also, the functional blocks in FIG. 3 are schematically illustrated, and the functional blocks may be integrally formed or may be subdivided when implemented. Also, the functions in FIG. 3 may be implemented by the processor 201 executing a program stored in the ROM 202 or the storage apparatus 204 or may be implemented by a processor inside the communication circuit 205 executing a predetermined piece of software, for example. Note that the processing executed by the functional units described above will not be described here, and the functions will be described here in broad terms.

The information acquiring unit 301 acquires a list (TAI list, for example) of area identifiers belonging to the same tracking area as the cell formed by the base station apparatus and information of the area identifiers of the neighbor cells adjacent to the cell. Note that the information acquiring unit 301 may acquire information in which, for example, cell identifiers of the neighbor cells and area identifiers are associated together as the information of the area identifiers of the neighbor cells. Also, the information acquiring unit 301 may acquire information in which, for example, the frequencies used in the neighbor cells and the area identifiers of the frequencies are associated together as the information of the area identifiers of the neighbor cells. For each neighbor cell, the determination unit 302 determines whether or not the area identifier of the neighbor cell is included in the acquired list. The information notification unit 303 notifies the terminal apparatus of information in which information indicating the neighbor cells (for example, cell identifiers of the neighbor cells and frequencies used in the neighbor cells) and the determination results of the determination unit 302 are associated together. Note that the information notification unit 303 may notify the terminal apparatus of a list of the neighbor cells and the area identifiers of the neighbor cells. In this case, the base station apparatus may not include the determination unit 302 as the determination to be executed by the determination unit 302 in the above description is executed by the terminal apparatus.

Figure 4:
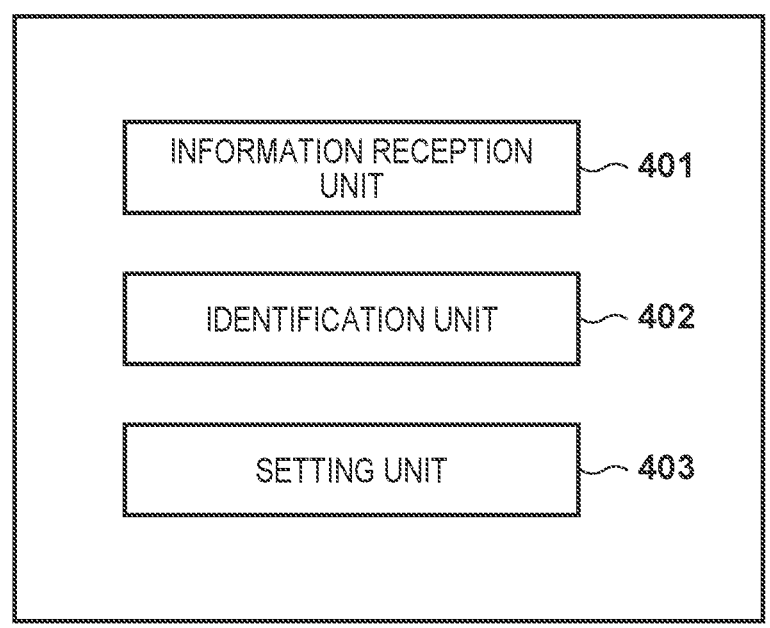
FIG. 4 is a diagram illustrating an example of the functional configuration of the terminal apparatus.

FIG. 4 is a diagram illustrating an example of the functional configuration of the terminal apparatus (the terminal apparatus 103). The terminal apparatus, for example, includes an information reception unit 401, an identification unit 402, and a priority setting unit 403. Note that in FIG. 4, only the functions relating specifically to the present embodiment are illustrated, and various other functions that a terminal apparatus may include are omitted from the diagram. For example, the terminal apparatus naturally includes other functions typically included in a terminal apparatus in a cellular communication system. Also, the functional blocks in FIG. 4 are schematically illustrated, and the functional blocks may be integrally formed or may be subdivided when implemented. Also, the functions in FIG. 4 may be implemented by the processor 201 executing a program stored in the ROM 202 or the storage apparatus 204 or may be implemented by a processor inside the communication circuit 205 executing a predetermined piece of software, for example. Note that the processing executed by the functional units described above will not be described here, and the functions will be described here in broad terms.

The information reception unit 401 receives the information notified by the information notification unit 303 of the base station apparatus. The information reception unit 401, for example, receives information in which information indicating whether the area identifiers of the neighbor cells adjacent to the residing cell are included in the list of area identifiers belonging to the same tracking area as the residing cell and information indicating the neighbor cells are associated together. Also, for example, the information reception unit 401 may receive information in which information indicating the neighbor cells adjacent to the residing cell and information of the area identifiers of the neighbor cells are associated together. The identification unit 402 identifies, on the basis of the received information, whether or not the area identifiers of the neighbor cells are included in the list of area identifiers belonging to the same tracking area as the residing cell. For example, when whether or not the area identifiers of the neighbor cells are included in the list of area identifiers belonging to the same tracking area as the residing cell is determined by the base station apparatus, the identification unit 402 may perform identification by checking the received information. Also, when the terminal apparatus determines whether or not the area identifiers of the neighbor cells are included in the list of area identifiers belonging to the same tracking area as the residing cell, the identification unit 402 performs identification by determining whether or not the received area identifiers are included in the list (TAI list, for example) stored by the terminal apparatus. The setting unit 403 sets the selection priority for each neighbor cell on the basis of the identification result of the identification unit 402. For example, when an area identifier of a neighbor cell is not included in the list of area identifiers belonging to the same tracking area as the residing cell, the setting unit 403 may lower the priority such that the neighbor cell is less likely to be selected.

Processing Flow

Next, the flow of the processing executed by the base station apparatus and the terminal apparatus will be described. Note that the example described below is just an example, and a detailed description of the operations and the like described above is not repeated.

FIGS. 5 and 6 illustrate examples of the flow of the processing when the base station apparatus (or the core network) determines whether or not the area identifiers of the neighbor cells adjacent to the cell formed by the base station apparatus are included in the list of area identifiers belonging to the same tracking area as the cell. FIG. 5 illustrates an example of the flow of the processing executed by the base station apparatus, and FIG. 6 illustrates an example of the flow of the processing executed by the terminal apparatus.

First, for the cell formed by the base station apparatus, the base station apparatus acquires the list of area identifiers belonging to the same tracking area as the cell and the area identifiers of the neighbor cells (step S501). The base station apparatus may acquire the list from the core network, for example, and may acquire the area identifiers of the neighbor cells from other base station apparatuses forming neighbor cells. Note that when a plurality of cell are formed and these cells include different area identifiers, the base station apparatus may acquire a list for each one of the plurality of cells. For the area identifier of each neighbor cell, the base station apparatus determines whether or not the area identifier is included in the acquired list (step S502). Then, for each one of the neighbor cells, the base station apparatus generates information in which information (for example, a cell identifier or frequency) indicating the neighbor cell and the determination result of step S502 are associated together and notifies the terminal apparatus of this via SIB, for example (step S503). Note that when the base station apparatus forms a plurality of cells, for each one of the plurality of cells, the base station apparatus executes the information notification of step S503. Also note that the plurality of cells may correspond to different area identifiers, and thus the information in the notification may be different for each cell.

When the terminal apparatus receives the information transmitted by the base station apparatus in step S503 (step S601), the terminal apparatus references the information and identifies whether or not the area identifiers of the neighbor cells adjacent to the residing cell are included in the list of area identifiers belonging to the same tracking area as the residing cell (step S602). Then, the terminal apparatus sets the selection priority of each neighbor cell on the basis of the identification result (step S603). For example, when an area identifier of a neighbor cell is included in the list, the terminal apparatus sets the selection priority of the neighbor cell relatively high, and when an area identifier of a neighbor cell is not included in the list, the terminal apparatus sets the selection priority of the neighbor cell relatively low. Note that the term neighbor cell used here includes in its meaning a cell different from the residing cell formed by the same base station apparatus as the residing cell. Note that the information indicating the neighbor cells may indicate frequency, and the terminal apparatus may set the selection priority per frequency.

Figure 7:
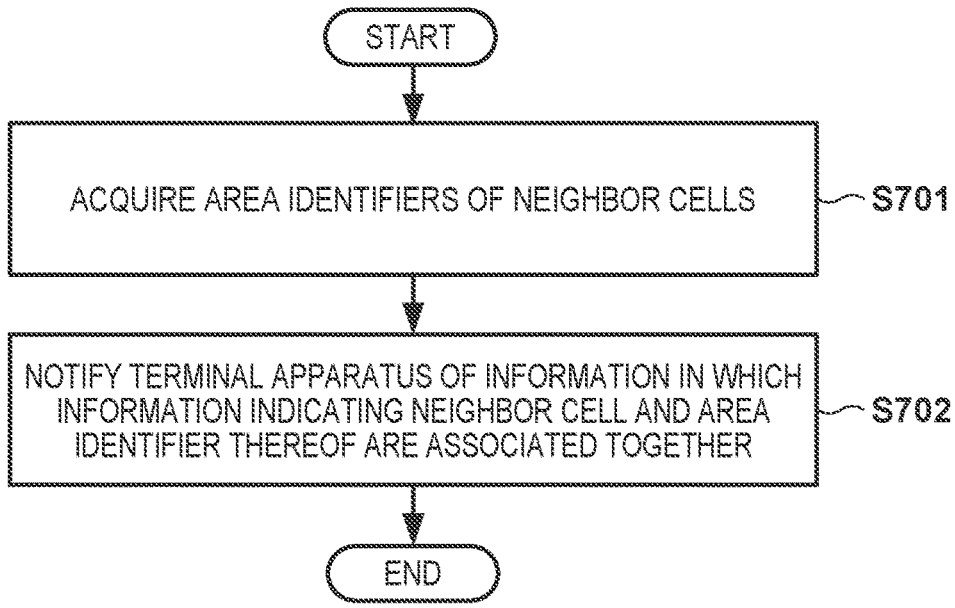
FIG. 7 is a diagram illustrating a second example of the flow of processing executed by the base station apparatus.
Figure 8:
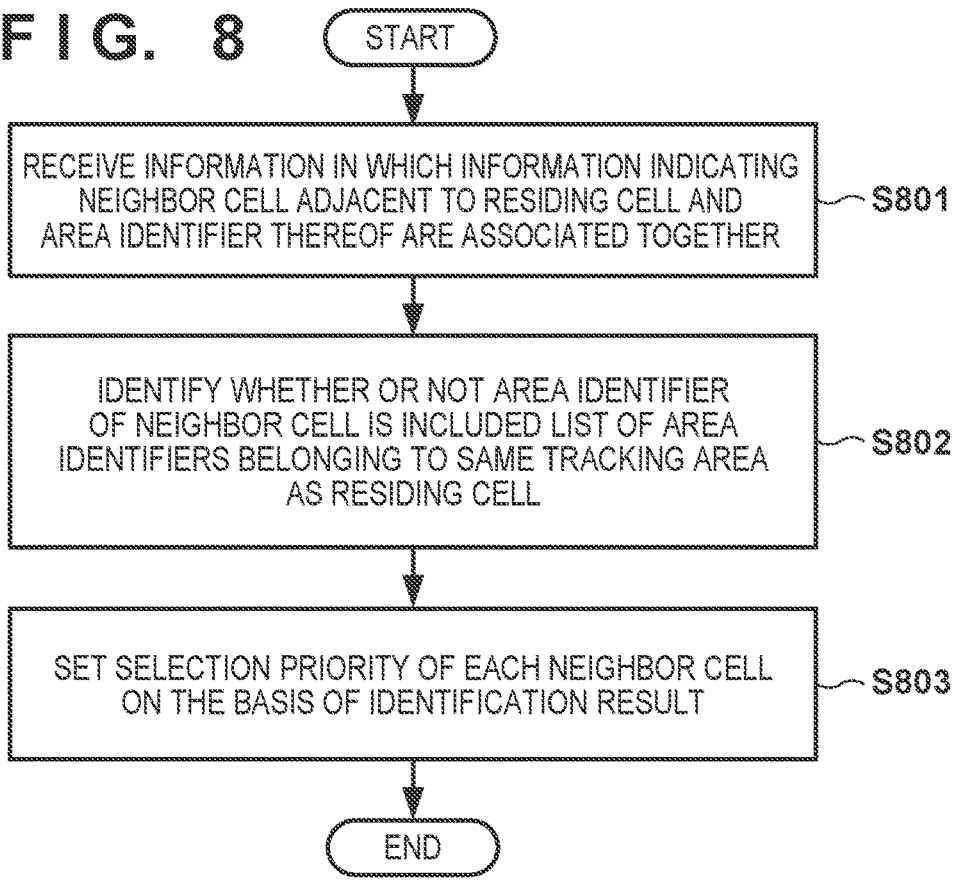
FIG. 8 is a diagram illustrating a second example of the flow of processing executed by the terminal apparatus.

FIGS. 7 and 8 illustrate examples of the flow of the processing when the terminal apparatus determines whether or not the area identifiers of the neighbor cell adjacent to the residing cell are included in the list of area identifiers belonging to the same tracking area as the residing cell. Note that FIG. 7 illustrates an example of the flow of the processing executed by the base station apparatus, and FIG. 8 illustrates an example of the flow of the processing executed by the terminal apparatus.

In the present processing, the base station apparatus acquires information indicating the area identifiers of the neighbor cells from another base station apparatus corresponding to a neighbor cell adjacent to the cell formed by the base station apparatus, for example (step S701). Also, the base station apparatus transmits to the terminal apparatus information in which information indicating the neighbor cells and the area identifiers of the neighbor cells are associated together (step S702). When the terminal apparatus receives the information relating to residing cell (step S801), the terminal apparatus references the list of area identifiers belonging to the same tracking area as the residing cell acquired and stored the last time tracking was executed, for example, and identifies whether the area identifier of the neighbor cell is included in the list (step S802). Then, as in step S603, the terminal apparatus sets the selection priority of each neighbor cell on the basis of the identification result (step S803). Note that the term neighbor cell used here includes in its meaning a cell different from the residing cell formed by the same base station apparatus as the residing cell. Note that the information indicating the neighbor cells may indicate frequency, and the terminal apparatus may set the selection priority per frequency.

As described above, priority is assigned for whether or not to preferentially select a neighbor cell on the basis of whether or not the area identifier of the neighbor cell is included in the list of area identifiers belonging to the same tracking area as the residing cell. Accordingly, the terminal apparatus can recognize whether or not tracking processing is required due to movement to a neighbor cell without needing to acquire the notification information relating to the neighbor cell. Thus, the terminal apparatus can quickly select a cell not requiring tracking, for example. This can prevent tracking processing from being executed frequently and enhance the efficiency of the tracking processing for the system overall.

Note that the present invention can increase the efficiency of communication infrastructure, for example, and thus can contribute to Goal 9 relating to "building infrastructure for industry and innovation" of the Sustainable Development Goals (SDGs) founded by the United Nations.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A base station apparatus, comprising:
   one or more processors; and
   one or more memories that store a computer-readable instruction for causing, when executed by the one or more processors, the one or more processors to function as:
     an acquiring unit configured to acquire information of a tracking area identifier (TAI) of a neighbor cell adjacent to a cell formed by the base station apparatus and a TAI list that comprises a plurality of TAIs belonging to a same tracking area to which the cell formed by the base station apparatus belongs, wherein the plurality of TAIs indicate tracking areas that can provide an identical network slice;
     a providing unit configured to provide, when performing registration of a position of a terminal apparatus, the terminal apparatus with TAIs belonging to the TAI list; and
     a transmission unit configured to transmit, after providing the TAIs belonging to the TAI list to the terminal apparatus, a broadcast signal including the TAI of the neighbor cell and a cell identifier of the neighbor cell.

2. The base station apparatus according to claim 1, wherein
   the broadcast signal includes information indicating a frequency used in the neighbor cell.

3. The base station apparatus according to claim 1, wherein
   the acquiring unit acquires the information of the TAI of the neighbor cell from another base station apparatus forming the neighbor cell.

4. The base station apparatus according to claim 3, wherein
   the acquiring unit acquires the TAI of the neighbor cell via an XN SETUP REQUEST message, an XN SETUP RESPONSE message, an NG-RAN NODE CONFIGURATION UPDATE message, or an NG-RAN NODE CONFIGURATION UPDATE ACKNOWLEDGE message.

5. The base station apparatus according to claim 1, wherein
   the broadcast signal is System Information Block (SIB).

6. A terminal apparatus, comprising:
   one or more processors; and
   one or more memories that store a computer-readable instruction for causing, when executed by the one or more processors, the one or more processors to function as:
     an acquisition unit configured to acquire, when performing registration of a position of the terminal apparatus, tracking area identifiers (TAIs) belonging to a TAI list that comprises a plurality of TAIs belonging to a same tracking area to which a residing cell where the terminal apparatus is in standby belongs, wherein the plurality of TAIs indicate tracking areas that can provide an identical network slice;
     a receiving unit configured to receive, after acquisition of the TAIs belonging to the TAI list from a base station apparatus forming the residing cell, a broadcast signal including a TAI of a neighbor cell adjacent to the residing cell and a cell identifier of the neighbor cell;
     a determining unit configured to determine whether or not the TAI of the neighbor cell is included in the acquired TAIs belonging to the TAI list; and
     a setting unit configured to set a priority for selecting the neighbor cell on a basis of a result of the determining.

7. A terminal apparatus, comprising:
   one or more processors; and
   one or more memories that store a computer-readable instruction for causing, when executed by the one or more processors, the one or more processors to function as:
     an acquisition unit configured to acquire, when performing registration of a position of the terminal apparatus, tracking area identifiers (TAIs) belonging to a TAI list that comprises a plurality of TAIs belonging to a same tracking area to which a residing cell where the terminal apparatus is in standby belongs, wherein the plurality of TAIs indicate tracking areas that can provide an identical network slice;
     a receiving unit configured to receive, after acquisition of the TAIs belonging to the TAI list from a base station apparatus forming the residing cell, a broadcast signal including a TAI of a neighbor cell adjacent to the residing cell and a cell identifier of the neighbor cell;
     a first determining unit configured to determine whether or not the TAI of the neighbor cell is included in the acquired TAIs belonging to the TAI list;
     a second determining unit configured to determine, on a basis of a result of the determining of the first determining unit, whether a predetermined network slice can be provided in the neighbor cell; and
     a setting unit configured to set, on a basis of a result of the determining of the second determining unit, a priority for selection of the neighbor cell.

8. The terminal apparatus according to claim 6, wherein
   the broadcast signal includes information indicating a frequency used in the neighbor cell.

9. The terminal apparatus according to claim 6, wherein
   the broadcast signal is System Information Block (SIB).

10. The terminal apparatus according to claim 6, wherein
    the setting unit sets a priority for when the TAI of the neighbor cell is included in the list higher than a priority for when the TAI of the neighbor cell is not included in the list.

11. The terminal apparatus according to claim 6, wherein
    on a basis of a set priority, the setting unit sets a condition relating to starting a search for a cell corresponding to the priority or a condition relating to movement to a cell corresponding to the priority.

12. A control method executed by a base station apparatus, comprising:
    acquiring information of a tracking area identifier (TAI) of a neighbor cell adjacent to a cell formed by the base station apparatus and a TAI list that comprises a plurality of TAIs belonging to a same tracking area to which the cell formed by the base station apparatus belongs, wherein the plurality of TAIs indicate tracking areas that can provide an identical network slice;

providing, when performing registration of a position of a terminal apparatus, the terminal apparatus with TAIs belonging to the TAI list; and transmitting, after providing the TAIs belonging to the TAI list to the terminal apparatus, a broadcast signal including the TAI of the neighbor cell and cell identifier of the neighbor cell.

13. A control method executed by a terminal apparatus, comprising:

acquiring, when performing registration of a position of the terminal apparatus, tracking area identifiers (TAIs) belonging to a TAI list that comprises a plurality of TAIs belonging to a same tracking area to which a residing cell where the terminal apparatus is in standby belongs, wherein the plurality of TAIs indicate tracking areas that can provide an identical network slice;

receiving, after acquisition of the TAIs belonging to the TAI list from a base station apparatus forming the residing cell, a broadcast signal including a TAI of a neighbor cell adjacent to the residing cell and a cell identifier of the neighbor cell;

determining whether or not the TAI of the neighbor cell is included in the acquired TAIs belonging to the TAI list; and setting a priority for selecting the neighbor cell on a basis of a result of the determining.

14. A non-transitory computer-readable storage medium that stores a program for causing a computer included in a base station apparatus to:

acquire information of a tracking area identifier (TAI) of a neighbor cell adjacent to a cell formed by the base station apparatus and a TAI list that comprises a plurality of TAIs belonging to a same tracking area to which the cell formed by the base station apparatus belongs, wherein the plurality of TAIs indicate tracking areas that can provide an identical network slice;

provide, when performing registration of a position of a terminal apparatus, the terminal apparatus with TAIs belonging to the TAI list; and transmit, after providing the TAI belonging to the TAI list to the terminal apparatus, a broadcast signal including the TAI of the neighbor cell and a cell identifier of the neighbor cell.

15. A non-transitory computer-readable storage medium that stores a program for causing a computer included in a terminal apparatus to:

acquire, when performing registration of a position of the terminal apparatus, tracking area identifiers (TAIs) belonging to a TAI list that comprises a plurality of TAIs belonging to a same tracking area to which a residing cell where the terminal apparatus is in standby belongs, wherein the plurality of TAIs indicate tracking areas that can provide an identical network slice;

receive, after acquisition of the TAIs belonging to the TAI list from a base station apparatus forming the residing cell, a broadcast signal including a TAI of a neighbor cell adjacent to the residing cell and a cell identifier of the neighbor cell;

perform determination of whether or not the TAI of the neighbor cell is included in the acquired TAIs belonging to the TAI list; and set a priority for selecting the neighbor cell on a basis of a result of the determination.

* * * * *